US008854666B2

(12) United States Patent
Lee

(10) Patent No.: US 8,854,666 B2
(45) Date of Patent: Oct. 7, 2014

(54) MOBILE DEVICE, IMAGE FORMING APPARATUS, NOTIFICATION SERVER AND CONTROL METHODS THEREOF

(75) Inventor: Dong Hoon Lee, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 211 days.

(21) Appl. No.: 13/449,626

(22) Filed: Apr. 18, 2012

(65) Prior Publication Data

US 2013/0016392 A1    Jan. 17, 2013

(30) Foreign Application Priority Data

Jul. 13, 2011    (KR) .................. 10-2011-0069443

(51) Int. Cl.
*G06F 15/00*    (2006.01)
(52) U.S. Cl.
USPC .......................................................... 358/1.15
(58) Field of Classification Search
CPC ................................................. H04M 1/72525
USPC ............................................................... 358/1.15
See application file for complete search history.

(56) References Cited

U.S. PATENT DOCUMENTS

2009/0097062 A1* 4/2009 Hayashi ........................ 358/1.15
2010/0041371 A1   2/2010 Natarajan et al.

* cited by examiner

*Primary Examiner* — Saeid Ebrahimi Dehkordy
(74) *Attorney, Agent, or Firm* — Staas & Halsey LLP

(57) ABSTRACT

A mobile device, an image forming apparatus, a notification server and control methods thereof in which, when it is desired to connect the image forming apparatus with the mobile device, it may be directly network-connected with the mobile device using identification information of the mobile device. The mobile device includes a mobile device input unit to receive an image forming apparatus application install command, a mobile device communication unit to, if an image forming apparatus application is installed, send identification information of the mobile device to the notification server and receive product information of the image forming apparatus to be connected from the notification server, and a mobile device controller to, if the product information of the image forming apparatus is received from the notification server and a command for connection with the image forming apparatus is input, network-connect the mobile device with the image forming apparatus.

19 Claims, 13 Drawing Sheets

FIG. 5

| MOBILE DEVICE IDENTIFICATION NUMBER | IP Address | Model Name | Status | DeviceID | Location | Mac address | Emulation | IPv6 |
|---|---|---|---|---|---|---|---|---|
| 010xxxXXXX | 192.168.0.x | ML1823 | Ready | xxxxxxx | xxxxxxx | xxxxxxx | PCL6 | Xxxxxxx |

FIG. 6

| MOBILE DEVICE IDENTIFICATION NUMBER | IP Address | Model Name | Status | DeviceID | Location | Mac address | Emulation | IPv6 |
|---|---|---|---|---|---|---|---|---|
| 010xxxXXXX | 192.168.0.x | ML1823 | Ready | xxxxxxx | xxxxxxx | xxxxxxx | PCL6 | Xxxxxxx |
| 010xxxXXXX | 192.168.0.x | ML1825 | Printing | Xxxxxxx | xxxxxxx | xxxxxxx | SPL | Xxxxxxx |

MOBILE DEVICE, IMAGE FORMING APPARATUS, NOTIFICATION SERVER AND CONTROL METHODS THEREOF

CROSS-REFERENCE TO RELATED APPLICATIONS

This application claims the priority benefit of Korean Patent Application No. 10-2011-0069443, filed on Jul. 13, 2011 in the Korean Intellectual Property Office, the disclosure of which is incorporated herein by reference.

BACKGROUND

1. Field

Embodiments relate to a mobile device, an image forming apparatus, a notification server and control methods thereof in which an image may be remotely processed.

2. Description of the Related Art

In general, with popularization of smart phones, there has been a great demand for the spread of an output service which is capable of outputting information of the same contents freely at any place or time using any communication device. In connection with this, there has been developed a mobile printing application to enable a mobile device to remotely search for a printer and output data through a located printer.

When the mobile printing application is run, a search is made for printers within the user's network range, and, if a plurality of printers are present within the user's network range, all the printers are listed and sent to the user. The user selects a desired printer from among the plurality of printers within the network range and performs a data output operation through the selected printer.

SUMMARY

Therefore, it is an aspect of an embodiment or embodiments to provide a mobile device, an image forming apparatus, a notification server and control methods thereof in which, when it is desired to connect the image forming apparatus with the mobile device, it may be directly network-connected with the mobile device using identification information of the mobile device.

Additional aspects of an embodiment or embodiments will be set forth in part in the description which follows and, in part, will be apparent from the description, or may be learned by practice.

In accordance with an aspect of an embodiment or embodiments, a mobile device includes a mobile device input unit to receive an image forming apparatus application install command, a mobile device communication unit to, if an image forming apparatus application is installed, send identification information of the mobile device to a notification server and receive product information of an image forming apparatus to be connected from the notification server, and a mobile device controller to, if the product information of the image forming apparatus is received from the notification server and a command for connection with the image forming apparatus is input, network-connect the mobile device with the image forming apparatus corresponding to the product information.

The mobile device may further include a mobile device display to display a message for confirmation of connection with the image forming apparatus.

The mobile device controller may control the mobile device to send data to be image-processed and image processing option commands to the image forming apparatus in response to an image forming processing command input through the input unit if the mobile device is network-connected with the image forming apparatus.

The mobile device communication unit may include a radio frequency (RF) unit to perform a wireless communication function, and a modem to encode and modulate a signal to be transmitted by the RF unit and demodulate and decode a signal received by the RF unit.

The mobile device may further include a mobile device memory unit to store the product information of the image forming apparatus and the identification information of the mobile device.

In accordance with an aspect of an embodiment or embodiments, an image forming apparatus includes an image forming apparatus input unit to receive identification information of a mobile device, an image forming apparatus communication unit to send the identification information of the mobile device and product information of the image forming apparatus to a notification server, and an image forming apparatus controller to network-connect the image forming apparatus with the mobile device if a connection command is sent from the mobile device.

The image forming apparatus may further include an application function unit to, when an image forming apparatus application is run in the mobile device, perform an application function of the image forming apparatus such that the image forming apparatus can be network-connected with the mobile device and receive data to be image-processed from the mobile device.

The image forming apparatus may further include an image forming apparatus engine to process data to be image-processed sent from the mobile device according to image processing options if the image forming apparatus is network-connected with the mobile device.

In accordance with an aspect of an embodiment or embodiments, a notification server includes a server communication unit to receive identification information of a mobile device sent from the mobile device, and identification information of the mobile device and product information of an image forming apparatus sent from the image forming apparatus, and a server controller to compare the identification information of the mobile device sent from the mobile device with the identification information of the mobile device sent from the image forming apparatus, and control the notification server to send the product information of the image forming apparatus to the mobile device if the identification information of the mobile device sent from the mobile device is the same as the identification information of the mobile device sent from the image forming apparatus.

The notification server may further include a server storage unit to store the identification information of the mobile device sent from the mobile device.

The server communication unit may send an error signal to the mobile device and image forming apparatus if the identification information of the mobile device sent from the mobile device is not the same as the identification information of the mobile device sent from the image forming apparatus.

In accordance with an aspect of an embodiment or embodiments, a method of controlling a mobile device includes receiving an image forming apparatus application install command, sending identification information of the mobile device to a notification server if an image forming apparatus application is installed, and receiving product information of an image forming apparatus to be connected from the notification server, and network-connecting the mobile device with the image forming apparatus corresponding to the product information if the product information of the image forming apparatus is received from the notification server and a command for connection with the image forming apparatus is input.

The method may further include outputting a message for confirmation of connection with the image forming apparatus if the product information of the image forming apparatus is received from the notification server.

The method may further include sending data to be image-processed and image processing options to the image forming apparatus in response to an image forming processing command if the mobile device is connected with the image forming apparatus.

The method may further include displaying an image to provide a function of the mobile device when the image forming apparatus application is run, and outputting a message for confirmation of connection with the image forming apparatus corresponding to the product information sent from the notification server.

In accordance with an aspect of an embodiment or embodiments, a method of controlling an image forming apparatus includes receiving identification information of a mobile device, sending the identification information of the mobile device and product information of the image forming apparatus to a notification server, and network-connecting the image forming apparatus with the mobile device if a connection command is sent from the mobile device.

The method may further include processing data to be image-processed sent from the mobile device according to image processing options if the image forming apparatus is network-connected with the mobile device.

In accordance with a further aspect of an embodiment or embodiments, a method of controlling a notification server includes receiving identification information of a mobile device sent from the mobile device, and identification information of the mobile device and product information of an image forming apparatus sent from the image forming apparatus, and comparing the identification information of the mobile device sent from the mobile device with the identification information of the mobile device sent from the image forming apparatus, and sending the product information of the image forming apparatus to the mobile device if the identification information of the mobile device sent from the mobile device is the same as the identification information of the mobile device sent from the image forming apparatus.

The method may further include sending an error signal to the mobile device and image forming apparatus if the identification information of the mobile device sent from the mobile device is not the same as the identification information of the mobile device sent from the image forming apparatus.

BRIEF DESCRIPTION OF THE DRAWINGS

These and/or other aspects of an embodiment or embodiments will become apparent and more readily appreciated from the following description of embodiments, taken in conjunction with the accompanying drawings of which:

FIG. 5 is a table illustrating product information sent from an image forming apparatus to a notification server according to an embodiment;

FIG. 6 is a table illustrating product information stored in a notification sever according to an embodiment

DETAILED DESCRIPTION

Figure 1:
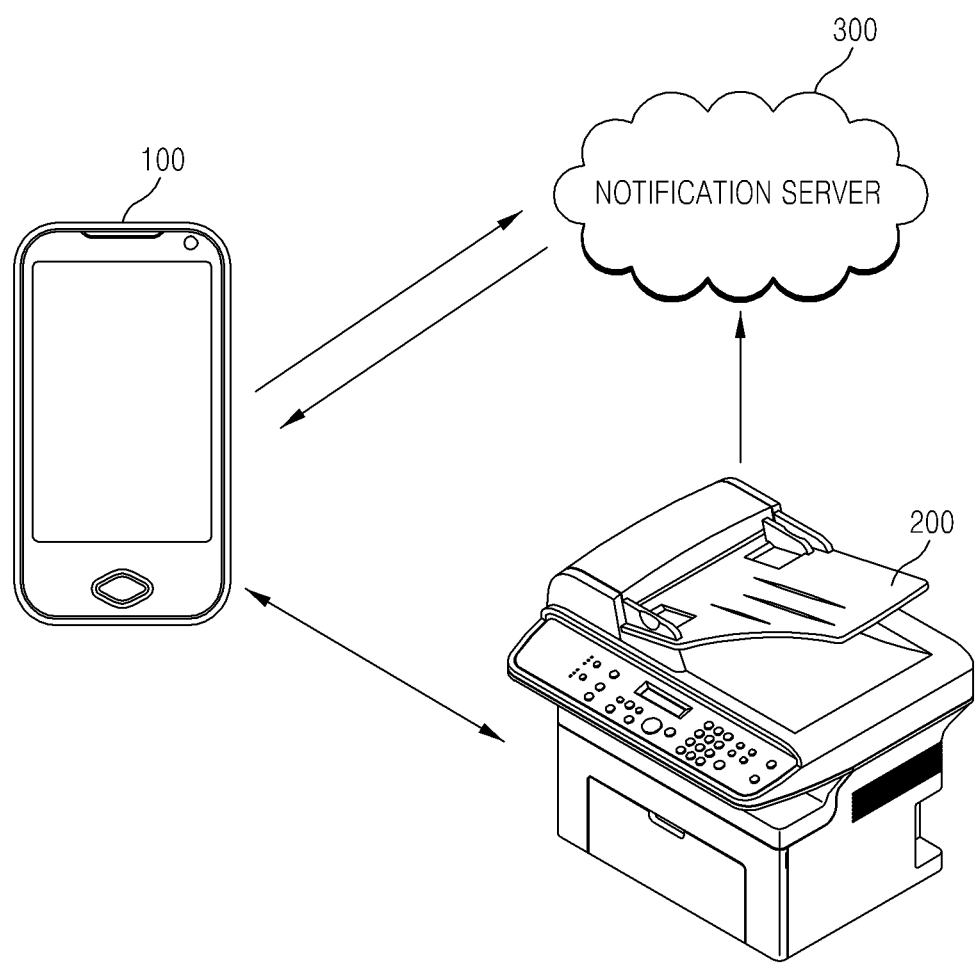
FIG. 1 is a schematic view of a mobile device, an image forming apparatus and a notification server according to an embodiment.

Reference will now be made in detail to embodiments, examples of which are illustrated in the accompanying drawings, wherein like reference numerals refer to like elements throughout.

FIG. 1 shows the configuration of an image forming system according to an embodiment.

The image forming system 1, may include a mobile device 100, an image forming apparatus 200 and a notification server 300.

An image forming apparatus application is installed in the mobile device 100. If the image forming apparatus application is run, the mobile device 100 may remotely output an image through the image forming apparatus 200 connected therewith.

The mobile device 100 is connected with the notification server 300 via a remote network. If the image forming apparatus application is installed in the mobile device 100, the mobile device 100 sends identification information thereof to the notification server 300. The identification information of the mobile device 100 includes information necessary to for the mobile device 100 to be identified, such as a number or email address of the mobile device 100.

The mobile device 100 receives product information of the image forming apparatus 200 to be connected therewith from the notification server 300. The mobile device 100 receives the product information of the image forming apparatus 200 and outputs a message for confirmation of connection with the image forming apparatus 200 corresponding to the received product information. If the mobile device 100 is manipulated to be connected with the image forming apparatus 200 displayed thereon, it is connected with the designated image forming apparatus 200 to remotely perform an image output operation.

The notification server 300 receives and stores identification information of the mobile device 100 from the mobile device 100. The notification server 300 also receives identification information of the mobile device 100 and product information of the image forming apparatus 200 from the image forming apparatus 200. The identification information of the mobile device 100 received from the image forming apparatus 200, is information for identification of the mobile device 100, which is input to the image forming apparatus 200 by the user. The product information of the image forming apparatus 200 includes, for example, an Internet protocol (IP)

address, a model name, a device identifier (ID), etc., and information about the image forming apparatus 200.

The notification server 300 determines whether the identification information of the mobile device 100 received from the image forming apparatus 200 is the same as the identification information of the mobile device 100 pre-stored in the notification server 300. If the identification information of the mobile device 100 received from the image forming apparatus 200 is the same as the identification information of the mobile device 100 pre-stored in the notification server 300, the notification server 300 sends the product information of the image forming apparatus 200 to the mobile device 100.

The image forming apparatus 200 is an apparatus capable of performing an image forming process for data received from the mobile device 100, and may be a printer, a scanner, a facsimile machine, a multifunction printer, or the like. The image forming apparatus 200 receives identification information of the mobile device 100 input by the user. The image forming apparatus 200 sends the received identification information and product information of the apparatus 200 to the notification server 300. The product information of the image forming apparatus 200 includes, for example, an IP address for network connection with the mobile device 100, a model name, etc.

If the user of the mobile device 100 confirms the product information of the image forming apparatus 200 and then manipulates the mobile device 100 to connect it with the image forming apparatus 200, the image forming apparatus 200 is connected with the mobile device 100 via a remote network. When the image forming apparatus 200 is network-connected with the mobile device 100, it may receive data to be processed and processing options, sent from the mobile device 100, and perform an image forming process for the received data according to the processing options.

Figure 2:
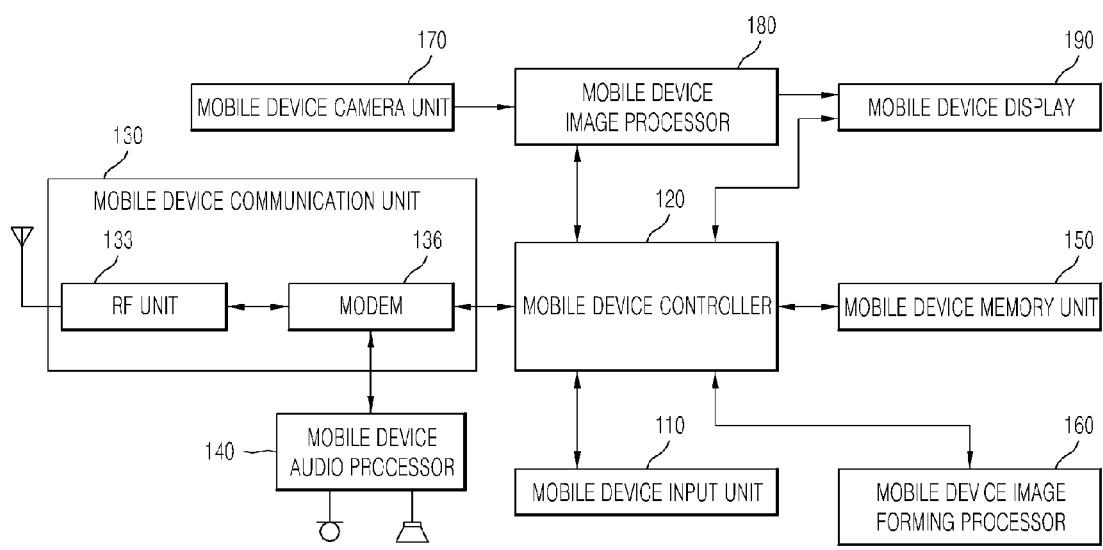
FIG. 2 is a block diagram of a mobile device according to an embodiment.

FIG. 2 is a block diagram of a mobile device according to an embodiment.

The mobile device 100 may include a mobile device input unit 110, a mobile device controller 120, a mobile device communication unit 130, a mobile device audio processor 140, a mobile device memory unit 150, a mobile device image forming processor 160, a mobile device camera unit 170, a mobile device image processor 180, and a mobile device display 190.

The mobile device input unit 110 may receive a manipulation of the user and deliver it to the mobile device controller 120. For example, the mobile device input unit 110 may receive an application install command input by the user. The mobile device input unit 110 may receive a command for connection with the image forming apparatus 200 input by the user. The mobile device input unit 110 may receive an image forming command and image forming options input by the user. The mobile device input unit 110 may include buttons or a touch screen arranged on the mobile device 100.

When the user inputs an image forming apparatus application install command through the mobile device input unit 110, the mobile device controller 120 installs an image forming apparatus application in response to the image forming apparatus application install command. The image forming apparatus application is a program that may connect the mobile device 100 and the image forming apparatus 200 with each other and remotely perform an image forming process.

If the user installs the image forming apparatus application, the mobile device controller 120 controls the mobile device communication unit 130 to send identification information of the mobile device 100 to the notification server 300. If product information of the image forming apparatus 200 is sent from the notification server 300 after the identification information of the mobile device 100 is sent to the notification server 300, the mobile device controller 120 controls the mobile device display 190 to display a message for confirmation of connection with the image forming apparatus 200 corresponding to the sent product information.

When the user inputs a command for connection with the image forming apparatus 200 corresponding to the product information displayed on the mobile device display 190 through the mobile device input unit 110, the mobile device controller 120 controls the mobile device 100 to network-connect the mobile device 100 with the corresponding image forming apparatus 200 using connection information (for example, an IP address) included in the product information.

The mobile device controller 120 controls the mobile device communication unit 130 to send data to be image-processed and image processing option commands to the image forming apparatus 200 according to the user's manipulation.

The mobile device communication unit 130 may transmit the identification information of the mobile device 100 to the notification server 300 and receive the product information of the image forming apparatus 200 from the notification server 300. The mobile device communication unit 130 may construct a wireless network with the image forming apparatus 200 based on the product information of the image forming apparatus 200 and transmit the data to be image-processed over the constructed wireless network.

The mobile device communication unit 130 may include a radio frequency (RF) unit 133 and a modem 136. The RF unit 133 performs a wireless communication function of the mobile device 100. The RF unit 133 may include an RF transmitter to convert the frequency of a signal to be transmitted and amplify the frequency-converted signal, and an RF receiver to low-noise amplify a received signal and down-convert the frequency of the amplified signal. The modem 136 may include a transmitter to encode and modulate a signal to be transmitted by the RF unit 133, and a receiver to demodulate and decode a signal received by the RF unit 133.

The mobile device audio processor 140 may be composed of a codec, which includes a data codec to process packet data or the like, and an audio codec to process an audio signal of voice or the like. The mobile device audio processor 140 functions to convert and reproduce a digital audio signal received from the modem 136 into an analog signal through the audio codec, or convert an analog audio signal generated and transmitted from a microphone into a digital audio signal through the audio codec and transmit the converted digital audio signal to the modem 136.

The mobile device memory unit 150 may be composed of a program memory and a data memory. The program memory may store a program to control a general operation of the mobile device 100, and a control program to drive the mobile device image forming processor 160. The data memory may include an internal memory disposed inside of the mobile device 100, and an external memory detachably mounted in the mobile device 100. The mobile device memory unit 150 may store downloaded content information. The mobile device memory unit 150 may store data to be image-processed. The mobile device memory unit 150 may store product information of the image forming apparatus 200 and identification information of the mobile device 100.

The mobile device image forming processor 160 may selectively set image forming for image data stored in the mobile device memory unit 150 of the mobile device 100. When the image forming for the image data is set, the mobile device image forming processor 160 creates a print order file having print information such as picture quality of the image data, the number of copies and a print size. When an automatic print for image data in an internal memory is set, the mobile device image forming processor 160 may move or copy the image data in the internal memory to an external memory card and then create an automatic print order file for the image data.

The mobile device camera unit 170 captures image data. To this end, the mobile device camera unit 170 may include a camera sensor to convert a captured optical signal into an electrical signal, and a signal processor to convert a captured analog image signal from the camera sensor into a digital image signal. The camera sensor may be composed of a charge coupled device (CCD) sensor or complementary metal oxide semiconductor (CMOS) sensor.

The mobile device image processor 180 functions to generate screen data to display an image signal output from the mobile device camera unit 170.

The mobile device display 190 displays an image to provide a function of the mobile device 100. The mobile device display 190 displays a graphic user interface (GUI) for the user's manipulation on the screen of the mobile device 100. The mobile device display 190 displays product information of the image forming apparatus 200 sent from the notification server 300. When an image forming apparatus application is run, the mobile device display 190 displays an interface for connection and data transmission/reception with the image forming apparatus 200 on the screen.

The mobile device display 190 displays an image signal output from the mobile device image processor 180 on the screen. The mobile device image processor 180 also displays user data output from the mobile device controller 120 on the screen. A liquid crystal display (LCD) may be employed as the mobile device display 190. In this case, the mobile device display 190 may include an LCD controller, a memory, and an LCD panel.

Figure 3:
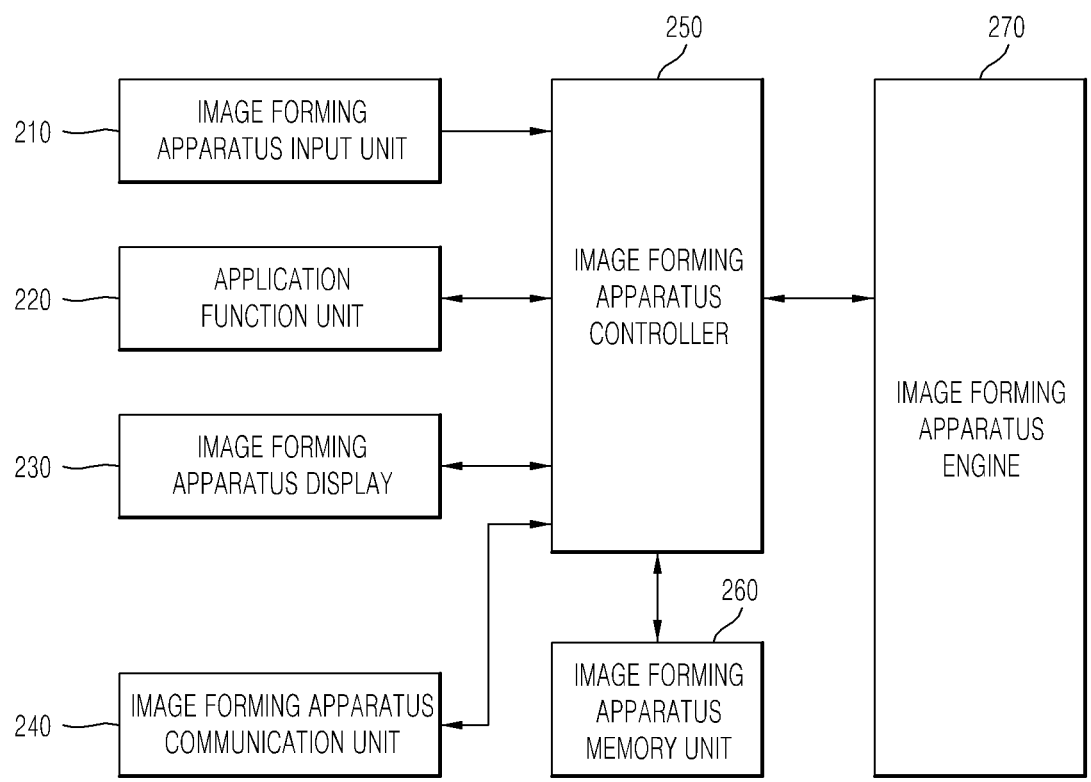
FIG. 3 is a block diagram of an image forming apparatus according to an embodiment.

FIG. 3 is a block diagram of an image forming apparatus according to an embodiment.

The image forming apparatus 200 may include an image forming apparatus input unit 210, an application function unit 220, an image forming apparatus display 230, an image forming apparatus communication unit 240, an image forming apparatus controller 250, an image forming apparatus memory unit 260, and an image forming apparatus engine 270.

The image forming apparatus input unit 210 may receive identification information of the mobile device 100 input by the user.

The application function unit 220 may, when an image forming apparatus application is run in the mobile device 100, perform an application function of the image forming apparatus 200 such that the image forming apparatus 200 may be network-connected with the mobile device 100 and receive data to be image-processed from the mobile device 100.

The image forming apparatus display 230 may display an image to provide a function of the image forming apparatus 200. The image forming apparatus display 230 may display the identification information of the mobile device 100 input by the user.

The image forming apparatus communication unit 240 may communicate with the notification server 300 and mobile device 100. The image forming apparatus communication unit 240 may transmit product information of the image forming apparatus 200 and the identification information of the mobile device 100 input by the user to the notification server 300. The image forming apparatus communication unit 240 may receive data to be image-processed and image processing option information from the mobile device 100.

If the identification information of the mobile device 100 is input by the user on the image forming apparatus 200, the image forming apparatus controller 250 controls the image forming apparatus communication unit 240 to transmit the input identification information and the product information of the image forming apparatus 200 to the notification server 300. Referring to FIG. 5, the image forming apparatus controller 250 may send, to the notification server 300, information such as an identification number of the mobile device 100, an IP address, a model name, a status, a device identifier (ID), a location, a media access control (MAC) address, an emulation, and IPv6. When the identification information input from the image forming apparatus 200 is the same as identification information input from the mobile device 100, the notification server 300 sends the product information of the image forming apparatus 200 to the mobile device 100. When the user of the mobile device 100 manipulates the mobile device 100 to connect the mobile device 100 with the image forming apparatus 200, the mobile device 100 and the image forming apparatus 200 are interconnected via a wireless network.

If data to be image-processed and image processing options are sent from the wirelessly connected mobile device 100, the image forming apparatus controller 250 may control the image forming apparatus 200 to perform an image forming process for the data according to the image processing options.

The image forming apparatus memory unit 260 may store data to be printed and print options. The data to be printed and the print options may be sent from the mobile device 100.

The image forming apparatus engine 270 performs the image forming process for the sent data under the control of the image forming apparatus controller 250. For example, when the image forming apparatus 200 is a printer, the image forming apparatus engine 270 may print the data.

Figure 4:
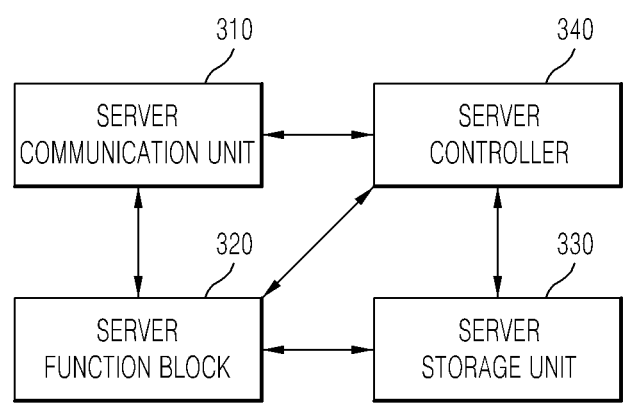
FIG. 4 is a block diagram of a notification server according to an embodiment.

FIG. 4 is a block diagram of a notification server according to an embodiment.

The notification server 300 may include a server communication unit 310, a server function block 320, a server storage unit 330, and a server controller 340.

The server communication unit 310 transmits and receives data with the mobile device 100 and the image forming apparatus 200. The server communication unit 310 receives identification information of the mobile device 100 from the mobile device 100 and delivers the received identification information to the server storage unit 330. The server communication unit 310 receives product information of the image forming apparatus 200, and identification information of the mobile device 100 that the image forming apparatus 200 sends for connection.

The server function block 320 performs natural functions of the server. The server function block 320 runs an operating system and various programs such that the notification server 300 functions as a server.

The server storage unit 330 stores various programs necessary for the operation of the notification server 300. The server storage unit 330 stores the identification information of the mobile device 100 sent from the mobile device 100. The server storage unit 330 also stores the identification information of the mobile device 100 and the product information of the image forming apparatus 200 sent from the image forming apparatus 200. Referring to FIG. 6, the server storage unit 330 may sequentially store information sent from a plurality of image forming apparatuses, each of which may include an identification number of the mobile device 100, an IP address, a model name, a status, a device ID, a location, a MAC address, an emulation, and IPv6.

The server controller 340 compares the identification information of the mobile device 100 sent from the mobile device 100 with the identification information of the mobile device 100 sent from the image forming apparatus 200. If the identification information of the mobile device 100 sent from the mobile device 100 is the same as the identification information of the mobile device 100 sent from the image forming apparatus 200, the server controller 340 sends the product information of the image forming apparatus 200 to the mobile device 100.

Figure 7A:
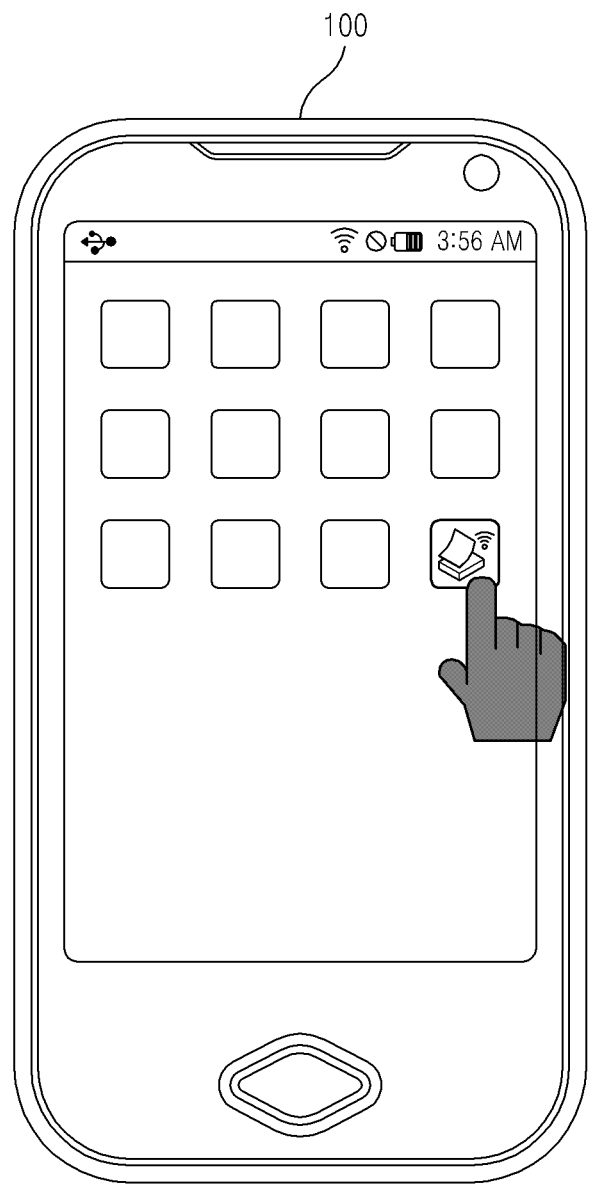
FIGS. 7A and 7B are views illustrating a user interface displayed on a display of a mobile device when the mobile device is connected with an image forming apparatus, according to an embodiment.
Figure 7B:
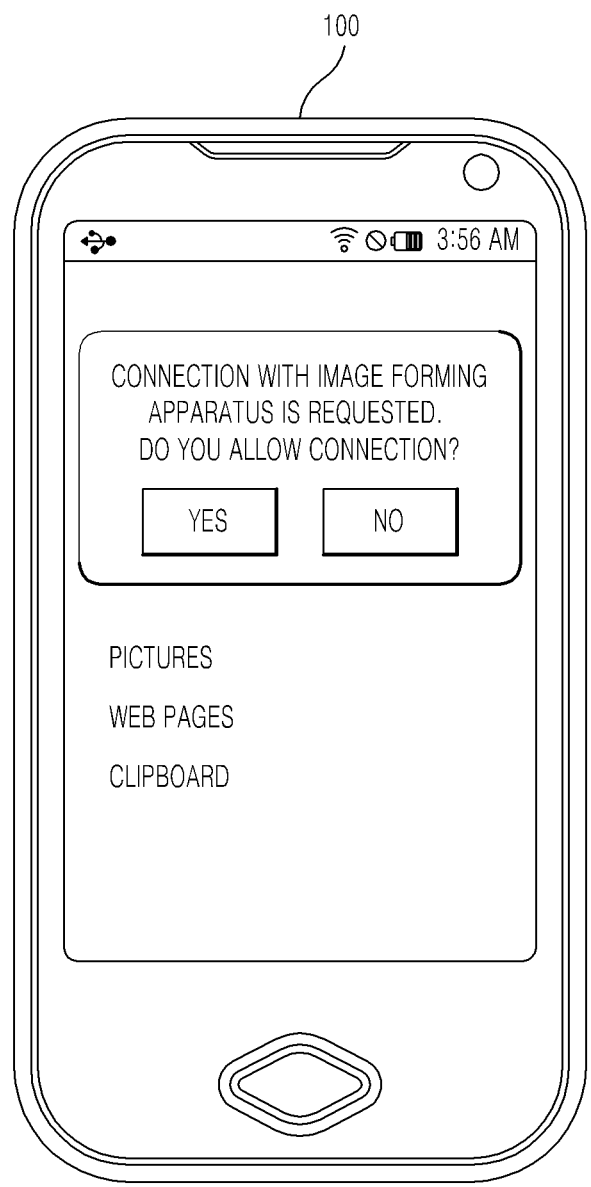

FIGS. 7A and 7B are views illustrating a user interface displayed on a display of a mobile device when the mobile device is connected with an image forming apparatus, according to an embodiment.

The mobile device display 190 displays a user interface for selection of an image forming apparatus application. Referring to FIG. 7A, the user may manipulate the user interface on the mobile device display 190 to run the image forming apparatus application.

If product information of the image forming apparatus 200 is sent from the notification server 300, the mobile device display 190 outputs a message for confirmation of connection with the image forming apparatus 200. Referring to FIG. 7B, the mobile device display 190 outputs a message "Connection with image forming apparatus is requested. Do you allow connection?". If the user selects "YES", the mobile device 100 and the image forming apparatus 200 are interconnected via a wireless network.

Figure 8A:
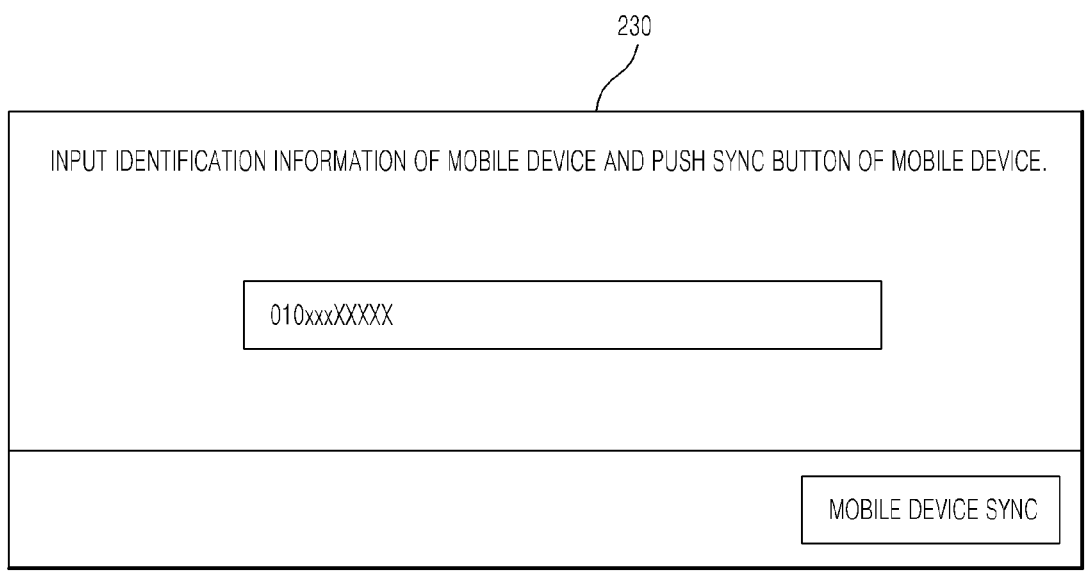
FIGS. 8A to 8C are views illustrating a user interface displayed on a display of an image forming apparatus when the image forming apparatus is connected with a mobile device, according to an embodiment.
Figure 8B:
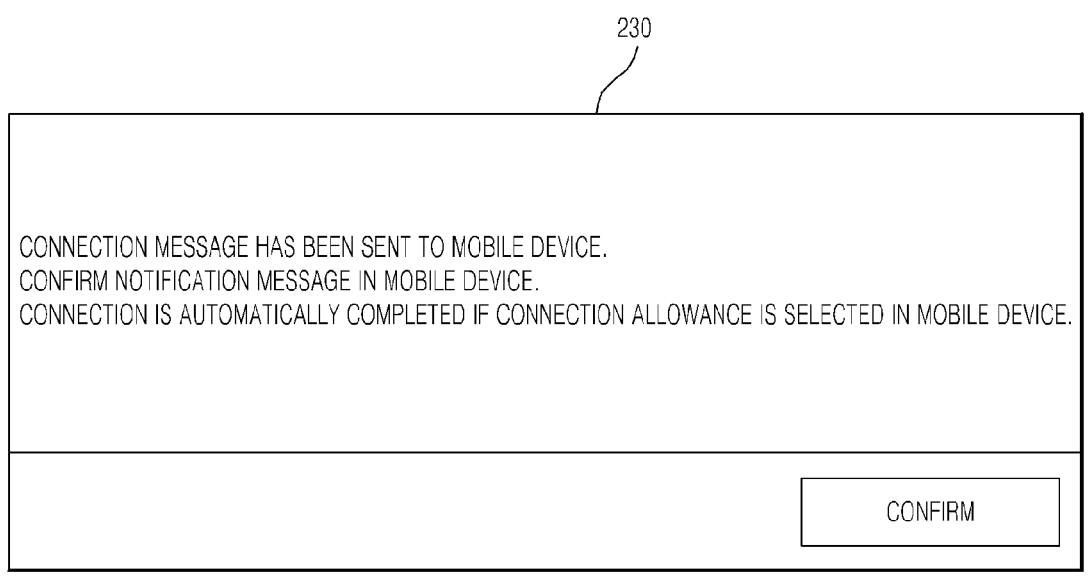
Figure 8C:
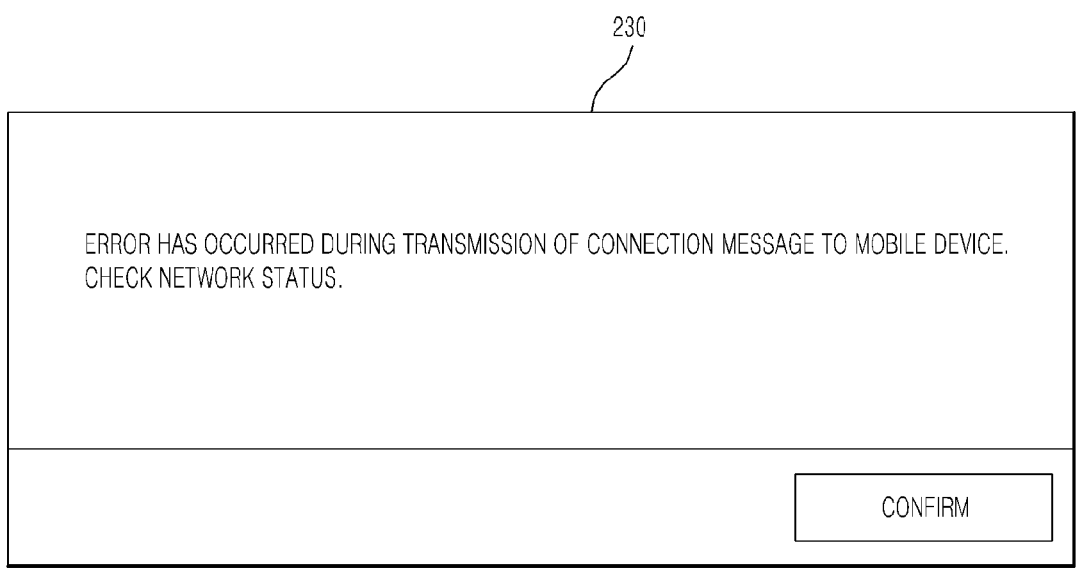

FIGS. 8A to 8C are views illustrating a user interface displayed on a display of an image forming apparatus when the image forming apparatus is connected with a mobile device, according to an embodiment.

If the user inputs a mobile application run command, the image forming apparatus display 230 outputs a message to invite the user to input identification information of the mobile device 100. Referring to FIG. 8A, if a mobile application is run, the image forming apparatus display 230 outputs a message "Input identification information of mobile device and push Sync button of mobile device.". The user may input identification information of the mobile device 100 to be connected and push a Sync button of the mobile device 100.

When the identification information of the mobile device 100 is input by the user and the Sync button of the mobile device 100 is pushed by the user, the input identification information and product information of the image forming apparatus 200 are sent to the notification server 300. Referring to FIG. 8B, the image forming apparatus display 230 may output a message indicative of the results of sending the identification information of the mobile device 100 and the product information of the image forming apparatus 200, and a message about subsequent processing.

On the other hand, if the identification information of the mobile device 100 and the product information of the image forming apparatus 200 fail to be sent to the notification server 300 under the condition that the identification information of the mobile device 100 to be connected is input by the user and the Sync button of the mobile device 100 is pushed by the user, the image forming apparatus display 230 may output an error message. Referring to FIG. 8C, when a transmission error occurs, the mobile device display 190 may output a message "Error has occurred during transmission of connection message to mobile device. Check network status.".

Figure 9:
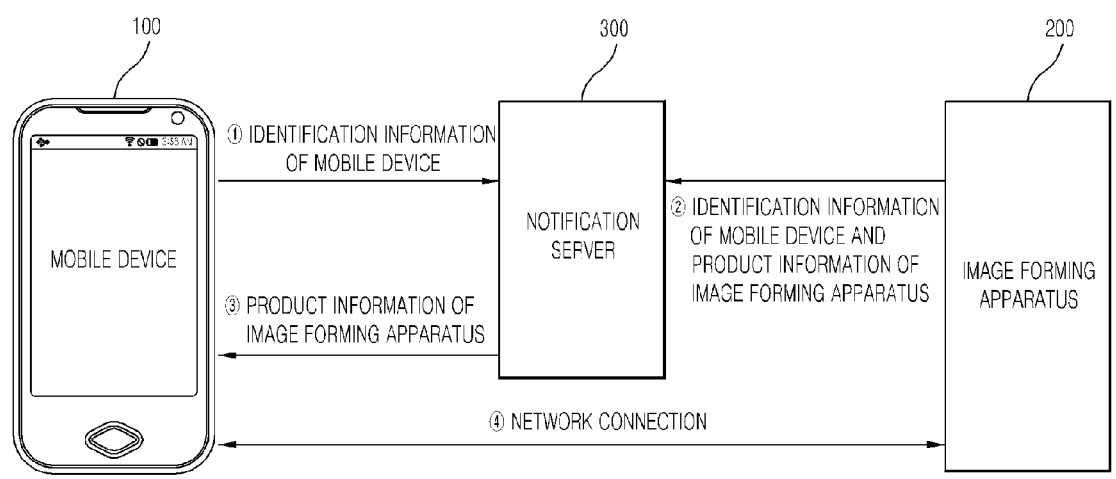
FIG. 9 is a schematic block diagram illustrating a network connection process of a mobile device, an image forming apparatus and a notification server according to an embodiment.

FIG. 9 is a schematic block diagram illustrating a network connection process of a mobile device, an image forming apparatus and a notification server according to an embodiment.

A network includes the mobile device 100, the image forming apparatus 200 and the notification server 300.

When an image forming apparatus application is installed in the mobile device 100, the mobile device 100 sends identification information thereof to the notification server 300. The identification information of the mobile device 100 may be a number or email address of the mobile device 100.

Upon receiving the identification information of the mobile device 100 from the mobile device 100, the notification server 300 stores the received identification information and then compares the stored identification information with identification information of the mobile device 100 sent from the image forming apparatus 200.

When the comparison result indicates that the identification information sent from the mobile device 100 and stored in the notification server 300 is the same as the identification information of the mobile device 100 sent from the image forming apparatus 200, the notification server 300 sends product information of the image forming apparatus 200 to the mobile device 100.

If the product information of the image forming apparatus 200 is sent from the notification server 300, the mobile device 100 may be network-connected with the image forming apparatus 200 according to the user's manipulation. In the case where the mobile device 100 is network-connected with the image forming apparatus 200, it may send data to be image-processed and image processing options to the image forming apparatus 200. The image forming apparatus 200 may process the data sent from the mobile device 100 according to the image processing options.

On the other hand, if a network between the mobile device 100 and the image forming apparatus 200 is set, the image processing may be carried out by selecting the network-set image forming apparatus 200 when the image forming apparatus application is run in the mobile device 100 at a later time.

Figure 10:
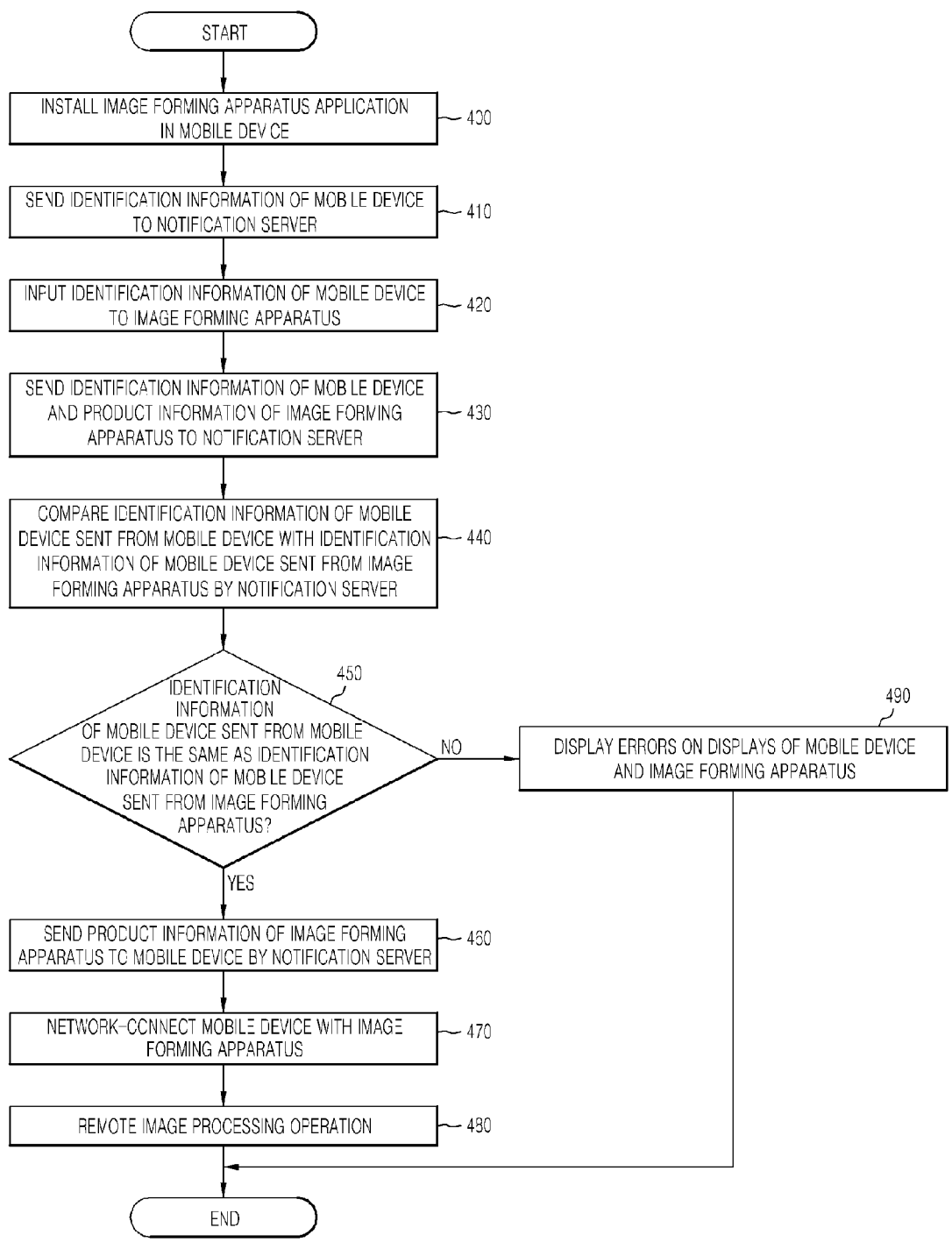
FIG. 10 is a flowchart illustrating a network connection process of a mobile device, an image forming apparatus and a notification server according to an embodiment.

FIG. 10 is a flowchart illustrating a network connection process of a mobile device, an image forming apparatus and a notification server according to an embodiment.

When the user inputs an image forming apparatus application install command through the mobile device input unit 110, the mobile device 100 installs an image forming apparatus application in response to the image forming apparatus application install command. The image forming apparatus application is a program that may connect the mobile device 100 and the image forming apparatus 200 with each other and remotely perform an image forming operation (400).

If the image forming apparatus application is installed, the mobile device 100 displays a user interface for selection of various functions. When the user manipulates the user interface to run the image forming apparatus application, the mobile device 100 sends identification information thereof to the notification server 300 (410).

The image forming apparatus 200 receives identification information of the mobile device 100 to be connected from the user. The image forming apparatus 200 sends the identification information of the mobile device 100 input by the user and product information of the image forming apparatus 200 to the notification server 300 (420 and 430).

The notification server 300 compares the identification information of the mobile device 100 sent from the mobile device 100 with the identification information of the mobile device 100 sent from the image forming apparatus 200. When the identification information of the mobile device 100 sent from the mobile device 100 is the same as the identification information of the mobile device 100 sent from the image forming apparatus 200, the notification server 300 sends the product information of the image forming apparatus 200 to the mobile device 100 (440, 450 and 460).

In the case where the identification information of the mobile device 100 sent from the mobile device 100 is not the same as the identification information of the mobile device 100 sent from the image forming apparatus 200, the notification server 300 sends an error signal to the image forming apparatus 200 and mobile device 100. The mobile device 100 and the image forming apparatus 200 display errors on their respective displays 190 and 230 (490).

When the mobile device 100 receives the product information of the image forming apparatus 200 sent from the notification server 300 and is then manipulated for connection by the user, it is network-connected with the image forming apparatus 200 (470).

When the image forming apparatus 200 is connected with the mobile device 100, it processes data to be image-processed sent from the mobile device 100 according to image processing options (480).

As is apparent from the above description, according to an aspect of an embodiment or embodiments, when it is desired to connect an image forming apparatus with a mobile device, it may be directly network-connected with the mobile device using identification information of the mobile device.

Although some embodiments have been shown and described, it would be appreciated by those skilled in the art that changes may be made in embodiments without departing from the principles and spirit, the scope of which is defined in claims and their equivalents.

What is claimed is:

1. A mobile device comprising:
   a mobile device input unit to receive an image forming apparatus application install command;
   a mobile device communication unit to, if an image forming apparatus application is installed, send identification information of the mobile device to a notification server and receive product information of an image forming apparatus to be connected from the notification server; and
   a mobile device controller to, if the product information of the image forming apparatus is received from the notification server and a command for connection with the image forming apparatus is input, connect the mobile device with the image forming apparatus corresponding to the product information.

2. The mobile device according to claim 1, further comprising a mobile device display to display a message for confirmation of connection with the image forming apparatus.

3. The mobile device according to claim 1, wherein the mobile device controller controls the mobile device to send data to be image-processed and image processing option commands to the image forming apparatus in response to an image forming processing command input through the input unit if the mobile device is connected with the image forming apparatus.

4. The mobile device according to claim 1, wherein the mobile device communication unit comprises:
   a radio frequency (RF) unit to perform a wireless communication function; and
   a modem to encode and modulate a signal to be transmitted by the RF unit and demodulate and decode a signal received by the RF unit.

5. The mobile device according to claim 1, further comprising a mobile device memory unit to store the product information of the image forming apparatus and the identification information of the mobile device.

6. An image forming apparatus comprising:
   an image forming apparatus input unit to receive identification information of a mobile device;
   an image forming apparatus communication unit to send the identification information of the mobile device and product information of the image forming apparatus to a notification server; and
   an image forming apparatus controller to connect the image forming apparatus corresponding to the product information with the mobile device if a connection command is received from the mobile device.

7. The image forming apparatus according to claim 6, further comprising an application function unit to, when an image forming apparatus application is run in the mobile device, perform an application function of the image forming apparatus such that the image forming apparatus is connected with the mobile device and receive data to be image-processed from the mobile device.

8. The image forming apparatus according to claim 6, further comprising an image forming apparatus engine to process data to be image-processed received from the mobile device according to image processing options if the image forming apparatus is connected with the mobile device.

9. A notification server comprising:
   a server communication unit to receive identification information of a mobile device from the mobile device, and identification information of the mobile device and product information of an image forming apparatus from the image forming apparatus; and
   a server controller to compare the identification information of the mobile device received from the mobile device with the identification information of the mobile device received from the image forming apparatus, and control the notification server to send the product information of the image forming apparatus to the mobile device if the identification information of the mobile device received from the mobile device corresponds to the identification information of the mobile device received from the image forming apparatus.

10. The notification server according to claim 9, further comprising a server storage unit to store the identification information of the mobile device received from the mobile device.

11. The notification server according to claim 9, wherein the server communication unit sends an error signal to the mobile device and image forming apparatus if the identification information of the mobile device received from the mobile device does not correspond to the identification information of the mobile device received from the image forming apparatus.

12. A method of controlling a mobile device, comprising:
   receiving an image forming apparatus application install command;
   sending identification information of the mobile device to a notification server if an image forming apparatus application is installed, and;
   receiving product information of an image forming apparatus to be connected from the notification server; and
   connecting the mobile device with the image forming apparatus corresponding to the product information if the product information of the image forming apparatus is received from the notification server and a command for connection with the image forming apparatus is input.

13. The method according to claim 12, further comprising outputting a message for confirmation of connection with the image forming apparatus if the product information of the image forming apparatus is received from the notification server.

14. The method according to claim 12, further comprising sending data to be image-processed and image processing options to the image forming apparatus in response to an image forming processing command if the mobile device is connected with the image forming apparatus.

15. The method according to claim 12, further comprising displaying an image to provide a function of the mobile device when the image forming apparatus application is run, and outputting a message for confirmation of connection with the image forming apparatus corresponding to the product information received from the notification server.

16. A method of controlling an image forming apparatus, comprising:
receiving identification information of a mobile device;
sending the identification information of the mobile device and product information of the image forming apparatus to a notification server; and
connecting the image forming apparatus corresponding to the product information with the mobile device if a connection command is received from the mobile device.

17. The method according to claim 16, further comprising processing data to be image-processed received from the mobile device according to image processing options if the image forming apparatus is connected with the mobile device.

18. A method of controlling a notification server, comprising:
receiving identification information of a mobile device sent from the mobile device, and identification information of the mobile device and product information of an image forming apparatus sent from the image forming apparatus; and
comparing the identification information of the mobile device received from the mobile device with the identification information of the mobile device received from the image forming apparatus;
sending the product information of the image forming apparatus to the mobile device if the identification information of the mobile device received from the mobile device corresponds to the identification information of the mobile device received from the image forming apparatus.

19. The method according to claim 18, further comprising sending an error signal to the mobile device and image forming apparatus if the identification information of the mobile device received from the mobile device does not correspond to the identification information of the mobile device received from the image forming apparatus.

* * * * *